UNITED STATES PATENT OFFICE.

HENRY PEMBERTON, OF ALLEGHENY, PENNSYLVANIA.

IMPROVED SAPONIFIER.

Specification forming part of Letters Patent No. 53,865, dated April 10, 1866.

*To all whom it may concern:*

Be it known that I, HENRY PEMBERTON, of the city Allegheny, in the county of Allegheny and State of Pennsylvania, have invented a new and useful Improvement in the Manufacture of Saponifier or Concentrated Lye; and I do hereby declare the following to be a full, clear, and exact description thereof.

The article known as "saponifier" or "concentrated lye," as heretofore manufactured and put up in small air-tight packages or boxes, under Letters Patent of the United States granted to George Thompson, of Philadelphia, is composed of the hydrated alkalies of soda or potassa that most commonly employed for this purpose being hydrate of soda. This caustic alkali is obtained from carbonate of soda by dissolving the carbonate of soda in boiling water, to which is added slaked lime. The lime, decomposing the soda, abstracts the carbonic acid from it and becomes carbonate of lime, which, being insoluble in water, is precipitated, and the clear liquor, being decanted, is evaporated to dryness, the result being hydrate of soda. The carbonate of soda used for this and other purposes, and, indeed, almost the entire supply of soda used for preparing the various compounds of sodium, has been heretofore almost exclusively procured from the chloride of sodium, or common salt.

My improvement consists in the use of the aluminates of the alkalies, or of the mixture of the aluminates with the hydrates of soda or potassa instead of the hydrates alone, in the preparation of saponifier for the manufacture of soap.

The advantages of the entire or partial use of the aluminates of these alkalies for the purpose named are very important and will be hereinafter set forth.

In order to enable others skilled in the art to use my said improvement, I will proceed to explain the process of manufacture and the ingredients employed therein.

For the purposes of this invention I prefer to use the mixture of aluminate and hydrate of soda obtained by the decomposition of the mineral known as "cryolite" or kryolite—a translucent whitish mineral found in Greenland. This substance is a sodafluate of alumina, being a natural combination of fluorine, sodium, and aluminium.

The mineral cryolite is first reduced by grinding to a fine powder, and is then boiled in a suitable vessel containing a sufficient quantity of water with which slaked lime is mixed. The relative quantities of cryolite and slaked lime to be thus boiled together are one hundred parts of powdered cryolite and seventy-eight parts of lime, the lime being measured as quicklime, or before it is slaked. This mixture is kept boiling for a sufficient time to effect the required chemical changes — say about two hours—and results in the formation of fluoride of calcium and a mixed solution of hydrate of soda and aluminate of soda. The result of the boiling is drawn off into suitable vessels and allowed to settle, when the fluoride of calcium is precipitated, leaving the clear liquor or solution of hydrate and aluminate of soda, which is decanted. The precipitate may then be washed, and the water of washing added to the liquor which had been drawn off previously.

The liquor obtained as just stated is then evaporated to dryness, the resulting salt produced being a solid compound or mixture of aluminate of soda and hydrate of soda. This is pulverized and packed in small quantities of any convenient weight—say one pound or more—in suitable air-tight packages or boxes made of any suitable material, such as iron, tin, paper, pasteboard, or wood. If the box, case, or package is non-metallic it may be rendered air-tight by the use of glue, varnish, or other article which will close the pores and joints.

Although the use of cryolite, yielding, as it does, a mixture of aluminate and hydrate of soda, is a very convenient means of manufacturing saponifier from aluminate of soda, I do not wish to confine myself to the employment of that mineral, nor to the mixture of the hydrates of soda or potassa with the aluminates of those alkalies, as any compound may be employed consisting in whole or in part of the aluminates of soda or potassa, with or without the admixture of the hydrates of those alkalies, and any material which yields alumina by chemical treatment may be used in the process.

The use of the aluminates of soda or potassa in the manufacture of caustic alkalies, either with or without the admixture of the hydrates of those alkalies, is a great improvement on the employment of the hydrates alone.

The advantages resulting from my improvement are, first, the superior cleanliness, whiteness, and purity of the soap manufactured with caustic alkali made in whole or in part with aluminate of soda or potassa; second, the increased detergent qualities imparted to the soap by the presence of the alumina; third, the removal of the caustic and irritant qualities usually possessed by all soaps in a greater or less degree, which effect is produced by the combining of the alumina with the excess of alkali which is present in the soap or becomes free in the act of using the soap for washing, thereby forming a neutral aluminate of the alkali, which, while it acts as a powerful detergent, exerts no injurious influence on the skin nor upon the most delicate fabric; fourth, the greater cheapness of the process of preparing the aluminate of soda or other alkali in comparison with the cost of preparing the hydrated alkalies; fifth, the much greater facility with which the aluminate of the alkalies can be protected from the action of the atmosphere, which would destroy its usefulness, than the hydrated alkalies, owing to the readiness with which the latter deliquesce and their greater caustic properties. The alumina present in the aluminates of the alkalies renders them less liable than the hydrates to absorb carbonic acid, which absorption, taking place on their slightest exposure to the atmosphere, causes them to deliquesce and renders them inoperative, owing to the formation of the useless and inactive carbonate of soda or potassa.

The hydrated alkalies are so highly corrosive and caustic in their properties that they cannot be preserved in air-tight boxes or packages made of wood, pasteboard, or paper, as they rapidly destroy such substances, while the aluminates of these alkalies are so much less violent in their action that they may be safely inclosed in those materials if the boxes are made air-tight.

My improved saponifier is therefore not only a superior article for the manufacture of soap, but it is more easily and cheaply produced and can be more readily preserved.

What I claim as my invention, and desire to secure by Letters Patent, is—

The use of the aluminates of soda or potassa, either with or without admixture of the hydrates of those alkalies, in the manufacture of saponifier or concentrated lye, substantially in the manner hereinbefore described.

In testimony whereof I, the said HENRY PEMBERTON, have hereunto set my hand.

H. PEMBERTON.

Witnesses:
    W. D. LEWIS,
    A. S. NICHOLSON.